(12) United States Patent
Wang et al.

(10) Patent No.: US 11,186,252 B2
(45) Date of Patent: Nov. 30, 2021

(54) RETRACTOR PRETENSIONER ASSEMBLY

(71) Applicant: AUTOLIV ASP, INC., Ogden, UT (US)

(72) Inventors: Bin Wang, Lake Orion, MI (US); Christopher D. Hall, Algonac, MI (US); Jon E. Burrow, Ortonville, MI (US); Kenneth H. Kohlndorfer, Roseville, MI (US); Richard W. Koning, Yale, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 338 days.

(21) Appl. No.: 16/406,285

(22) Filed: May 8, 2019

(65) Prior Publication Data
US 2020/0353892 A1    Nov. 12, 2020

(51) Int. Cl.
*B60R 22/46* (2006.01)
*B60R 22/34* (2006.01)

(52) U.S. Cl.
CPC .. *B60R 22/4628* (2013.01); *B60R 2022/3402* (2013.01); *B60R 2022/4642* (2013.01)

(58) Field of Classification Search
CPC ............... B60R 22/46; B60R 22/4628; B60R 2022/3402; B60R 2022/4642
See application file for complete search history.

(56) References Cited

U.S. PATENT DOCUMENTS

| | | | |
|---|---|---|---|
| 5,881,962 A | 3/1999 | Schmidt et al. | |
| 7,988,084 B2 | 8/2011 | Lombarte et al. | |
| 8,371,613 B2 | 2/2013 | Hodatsu et al. | |
| 9,555,767 B2 | 1/2017 | Gentner et al. | |
| 9,796,356 B2 * | 10/2017 | Hertag | B60R 22/4628 |
| 10,328,895 B2 * | 6/2019 | Kohlndorfer | B60R 22/28 |
| 2001/0035472 A1 | 11/2001 | Hamaue et al. | |
| 2006/0243843 A1 | 11/2006 | Clute | |
| 2012/0006925 A1 | 1/2012 | Burrow et al. | |
| 2013/0327872 A1 | 12/2013 | Gentner et al. | |
| 2013/0327873 A1 | 12/2013 | Gentner et al. | |
| 2015/0336538 A1 | 11/2015 | Gray et al. | |
| 2015/0336539 A1 | 11/2015 | Gray et al. | |
| 2016/0114762 A1 | 4/2016 | Landbeck et al. | |

(Continued)

FOREIGN PATENT DOCUMENTS

| | | |
|---|---|---|
| DE | 10 2006 031 359 A1 | 10/2007 |
| DE | 10 2006 031 360 A1 | 10/2007 |

(Continued)

*Primary Examiner* — Sang K Kim
(74) *Attorney, Agent, or Firm* — Dickinson Wright PLLC

(57) ABSTRACT

A seatbelt pretensioning retractor assembly for use in a vehicle is provided. The seatbelt pretensioning retractor assembly includes a housing adapted for being mounted to a frame and having an interior cavity, a pretensioner tube having an arcuate and curved shape, a pretensioner wheel rotatably mounted to the housing and fixedly coupled to a spindle, a pretensioner rod disposed within the tube and a guide plate having a guide portion and a rod guide. The pretensioner rod engages with the pretensioner wheel during pretensioning. In addition, the pretensioner wheel includes a body portion, a pair of flanges radially extending from the body portion and a plurality of vanes with the cavities formed between adjacent two of the plurality of vanes.

18 Claims, 11 Drawing Sheets

(56) References Cited

U.S. PATENT DOCUMENTS

2018/0265036 A1\* 9/2018 Kohlndorfer ....... B60R 22/4628
2019/0270428 A1\* 9/2019 Kohlndorfer ....... B60R 22/4628

FOREIGN PATENT DOCUMENTS

| DE | 10 2010 051 419 A1 | 11/2010 |
|---|---|---|
| DE | 10 2010 051 463 A1 | 5/2012 |
| DE | 10 2012 019 004 A1 | 3/2014 |
| WO | WO 2012/065654 A1 | 5/2012 |
| WO | WO 2012/065656 A1 | 5/2012 |
| WO | WO 2012/065672 A1 | 5/2012 |

\* cited by examiner

RETRACTOR PRETENSIONER ASSEMBLY

FIELD

The present disclosure relates to seatbelt restraint devices for restraining an occupant of a vehicle, and more particularly relates to devices for pretensioning a seatbelt.

BACKGROUND

The statements in this section merely provide background information related to the present disclosure and may not constitute prior art.

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages.

A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either during an impact of the vehicle or even prior to impact (also known as a "pre-pretensioner") to enhance occupant restraint performance. The pretensioner takes out slack in the webbing and permits the belt restraint system to couple with the occupant early in the crash sequence. One type of pretensioner acts on the webbing retractor to tension the belt.

Various designs of retractor pretensioners presently exist, including a type known as a roto-pretensioner that incorporates a gas generator using a pyrotechnic charge for generating inflation gas. Examples of such roto-pretensioners are described in U.S. Pat. No. 5,881,962, filed Apr. 11, 1995, U.S. Patent Application Publication No. 2006/0243843, filed Apr. 27, 2005, U.S. Patent Application Publication No. 2012/0006925, filed Jul. 6, 2010, and U.S. Pat. No. 7,988,084, filed Aug. 2, 2011, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack and pinion, or series of balls or a rod element disposed in a pretensioner tube, which engage with and wind a retractor spool pretensioner wheel to retract the webbing.

One issue with pretensioners using a series of metallic balls is the weight of the series of balls required for a full pretensioning stroke, as well as the corresponding cost of supplying multiple metallic balls with strict tolerances. Further, for pretensioners using a series of metallic balls, or rack and pinion based systems, is the need for a synchronizing or clutch feature to ensure that the series of balls or pinion sufficiently engage the retractor spool pretensioner wheel.

Another issue with pretensioners is known as a low resistance condition, where the driving elements will reach an end of stroke without experience substantial resistance. This can occur if there is excessive slack in the seatbelt webbing. In these cases, the low resistance results in a lower amount of backpressure from the driving elements. The backpressure is produced by the engagement between the driving elements and the pretensioner wheel, so lower backpressure reduces the pressure on a sealing element that trails the driving elements. Reduced pressure on the sealing elements reduces the amount that the sealing element is compressed circumferentially, which results in reduced sealing forces which can allow gas to leak from the tube around the series of balls.

A further issue with pretensioners is the need to maintain the retractor and the seatbelt webbing in a locked condition at the end of the pretensioning stroke. When the retractor spool does not remain locked, payback can occur which allows the seatbelt to unspool and reintroduce slack in the seatbelt. One method for maintaining the locked position includes maintaining pressure from the gas generator beyond the amount needed for the pretensioning stroke. However, this adds weight and cost, and requires a higher capacity gas generator.

SUMMARY

The present disclosure relates to a seatbelt pretensioning retractor assembly including a spindle and a frame for use in a vehicle. In particular, the present disclosure relates a pretensioner wheel for the motor vehicle seat belt pretensioner, which includes a pretensioner rod, a housing, a guide plate and a pretensioner tube.

According to an aspect of the present disclosure, a pretensioner rod is used to engage with the pretensioner wheel, which includes a body portion having an annular shape, a pair of flanges radially extending from the body portion of the pretensioner wheel, a plurality of vanes extending between the pair of flanges along radials extending from a central axis of rotation of the body portion, and a cavity formed between adjacent two of the plurality of vanes. The plurality of vanes each have a first sidewall and a second sidewall formed as a triangular shape on a cross-section plane of the pretensioner wheel perpendicular to the central axis, and the first sidewall and the second sidewall form a radially outer tip. The tip of each of the plurality of vanes lies on the radials extending from the central axis of rotation of the pretensioner wheel, and has a first angle formed between the radial and the first sidewall and a second angle formed between the radial and the second sidewall. The first angle is greater than the second angle. The second sidewall of the vanes is angled to contact with a chamfered surface of a distal end portion of the pretensioner rod when the pretensioner rod is exited from the pretensioner tube. That is, the second sidewall formed with the second angle is angled to contact with the chamfered surface of the pretensioner rod.

According to a further aspect of the present disclosure, a tip angle of the radially outer tip is formed between the first sidewall and the second sidewall, and the tip angle is between 35 degrees and 65 degrees.

According to a further aspect of the present disclosure, the tip of the each vane is formed as a radiused shape defining an external radius for deforming the pretensioner rod when the pretensioner rod is engaged with the pretensioner wheel. The radius of the tip is preferably between 0.35 mm and 0.55 mm. A deformed depth of the pretensioner rod is preferably between 10% and 50% of a radial thickness of the pretensioner rod engaged with the vanes of the pretensioner wheel.

According to a further aspect of the present disclosure, the first angle of the vanes is preferably greater than 28 degrees and less than 38 degrees, and the second angle is preferably greater than 17 degrees and less than 27 degrees. The first angle is preferably about 30 degrees and the second angle is preferably about 25 degrees.

According to a further aspect of the present disclosure, each of the first and second sidewalls of the vanes form a first and second thumbnail flat surface respectively. An area of the second thumbnail flat surface is larger than an area of the first thumbnail flat surface for engaging with the pretensioner rod on the larger thumbnail flat area of the second sidewall when the pretensioner rod firstly exits from the pretensioner tube.

According to a further aspect of the present disclosure, a tip circle is defined by connecting each of the radially outer vane tips on the cross-section plane of the pretensioner wheel perpendicular to the central axis. Each of the plurality of vanes forms a root section, which defines a root circle by connecting each of the root sections on the cross-section plane of the pretensioner wheel perpendicular to the central axis. A vane height is defined by subtracting a root radius of the root circle from a tip radius of the tip circle, and the vane height is preferably equal to or less than a half of a radial thickness of a cross-section of the pretensioner rod engaged with the vanes of the pretensioner wheel as a measure to prevent the pretensioner rod from being cut by the pretensioner wheel vanes when the pretensioner rod is engaged with the pretensioner wheel during pretensioning.

According to a further aspect of the present disclosure, the vanes of the pretensioner wheel are formed with an odd number between 5 and 13 vanes. In an exemplary embodiment, the pretensioner wheel is formed with 11 vanes.

According to a further aspect of the present disclosure, each of the vane cavities is formed as a pocket to receive the pretensioner rod when the pretensioner rod is engaged with the pretensioner wheel. The pocket of the cavity is formed as a U-shape on a cross-section plane of the pretensioner wheel parallel to the central axis. The pocket is formed with a large space to contain a deformed pretensioner rod with both flanges radially extending from the body portion. In addition, a bottom of the pocket is formed with a semi-circle shape or a radiused shape.

According to an aspect of the present disclosure, a seatbelt pretensioning retractor assembly for a motor vehicle includes a spindle, a frame, a housing, a pretensioner tube, which has an arcuate and curved shape having a first tube end in fluid communication with a gas generator and an exit in fluid communication in the housing, a pretensioner rod, which is disposed within the pretensioner tube and has a proximal end disposed towards the gas generator and a distal end disposed at the exit of the pretensioner tube, and a pretensioner wheel rotationally mounted to the housing and fixedly coupled to the spindle.

Further details and benefits will become apparent from the following detailed description of the appended drawings. The drawings are provided herewith purely for illustrative purposes and are not intended to limit the scope of the present disclosure.

DRAWINGS

The drawings described herein are for illustration purposes only and are not intended to limit the scope of the present disclosure in any way.

Figure 3:
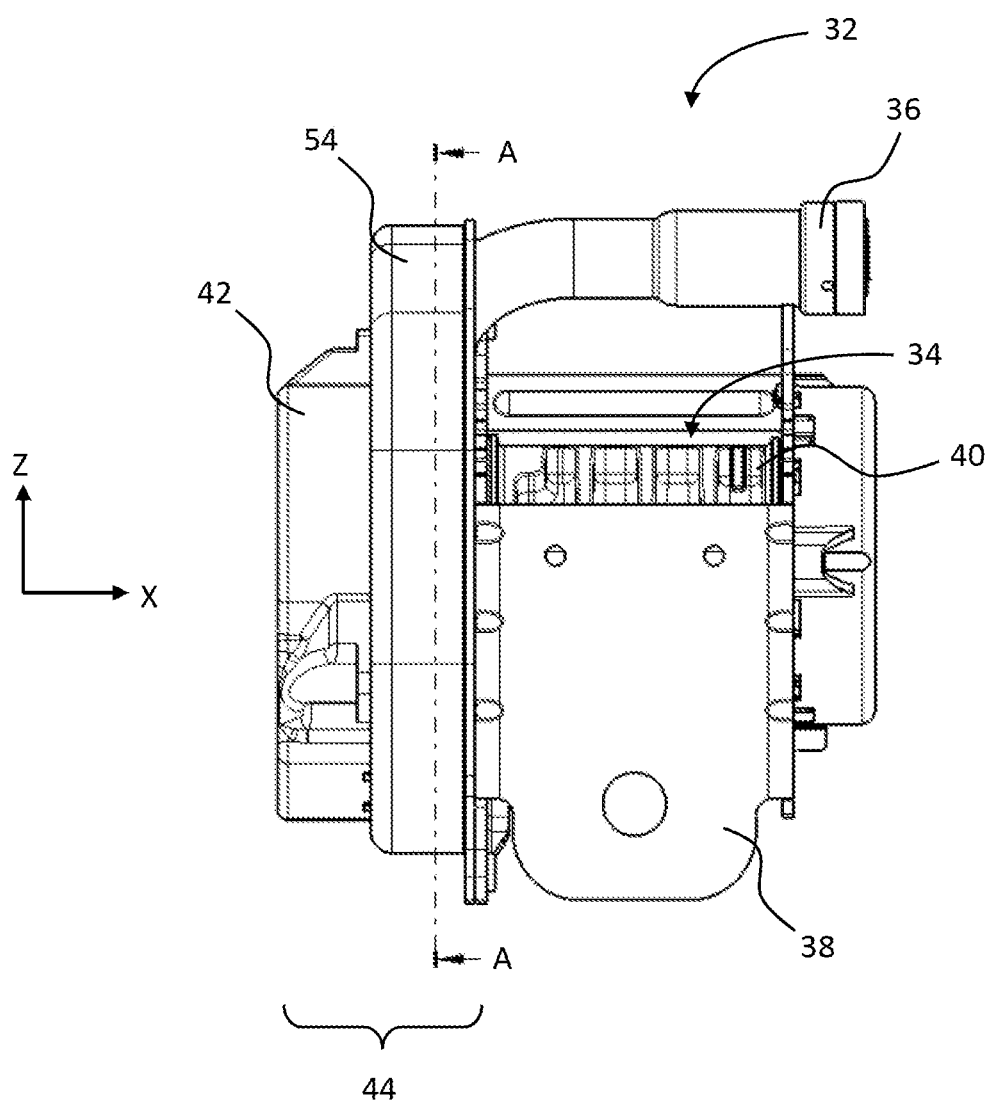
FIG. 3 is a plane view of the seatbelt retractor assembly including the pretensioner system in accordance with an exemplary form of the present disclosure.
Figure 9A:
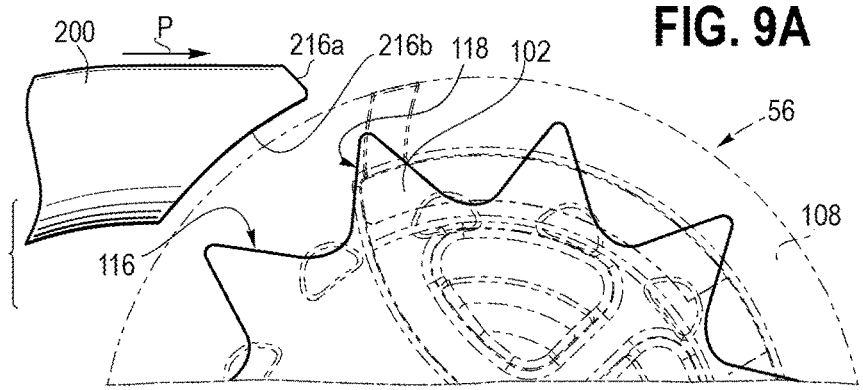
Figure 9B:
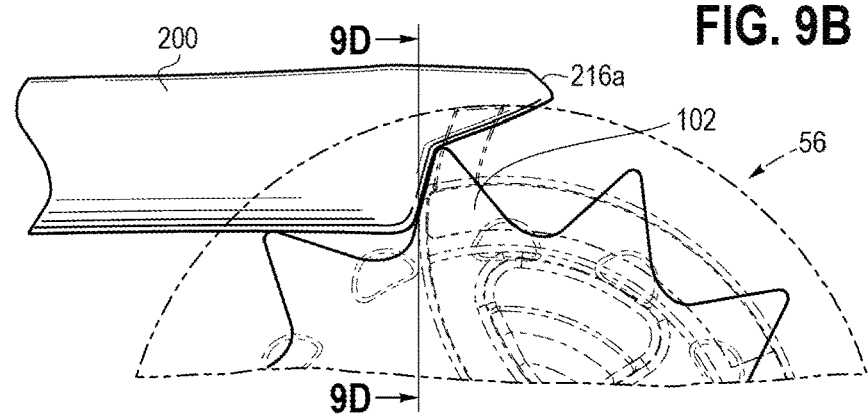
Figure 9C:
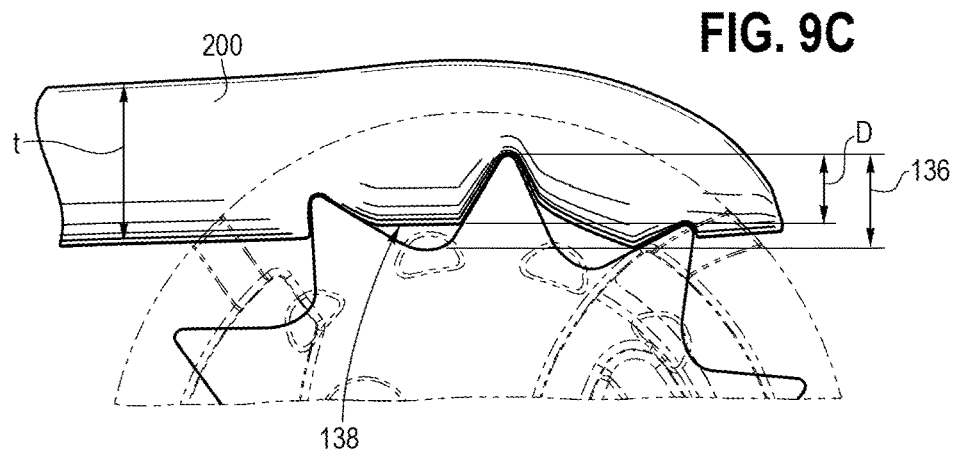
Figure 9D:
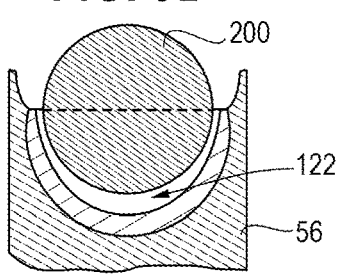
Figure 10:
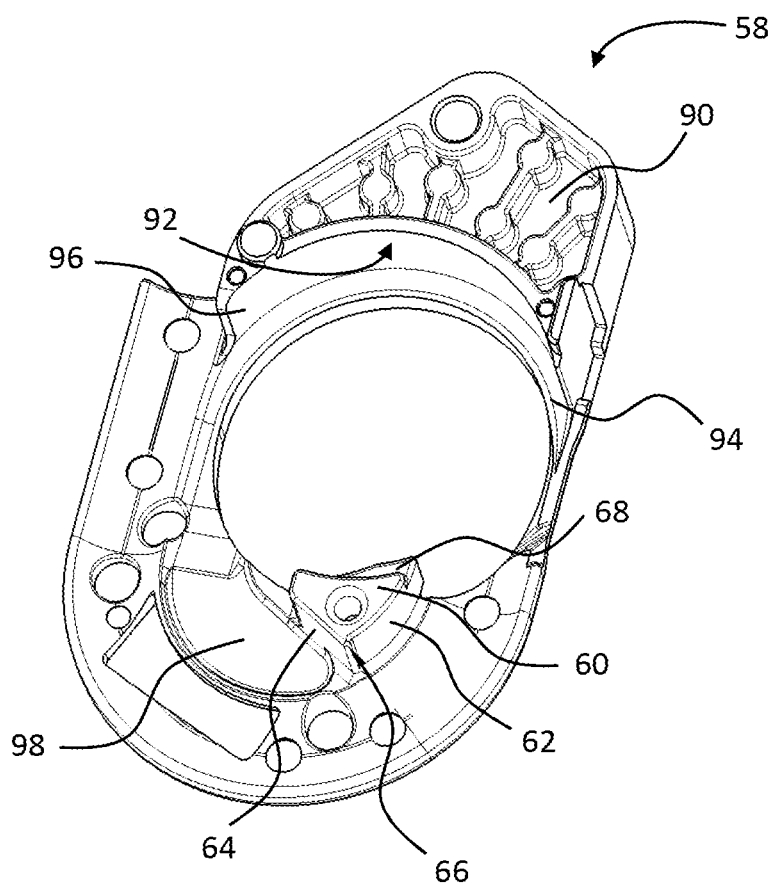
Figure 11:
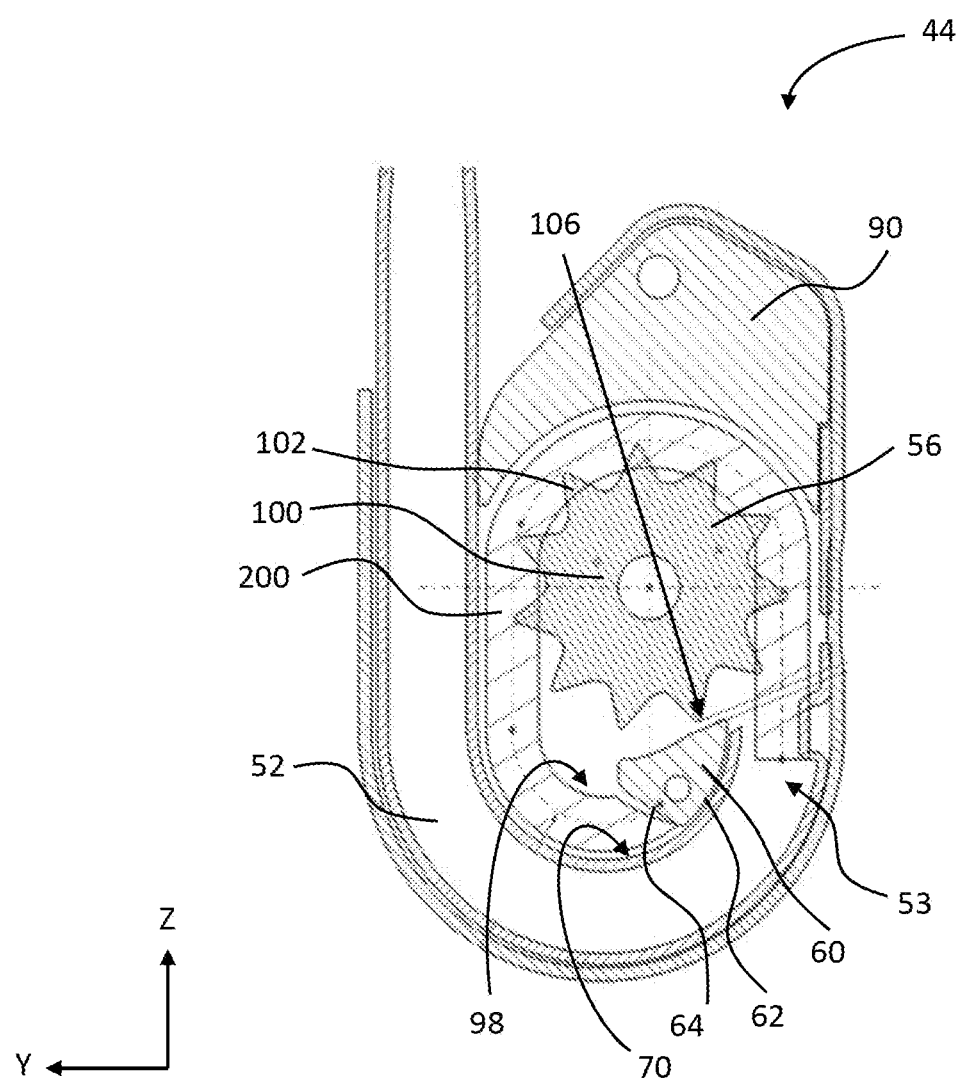
Figure 12:
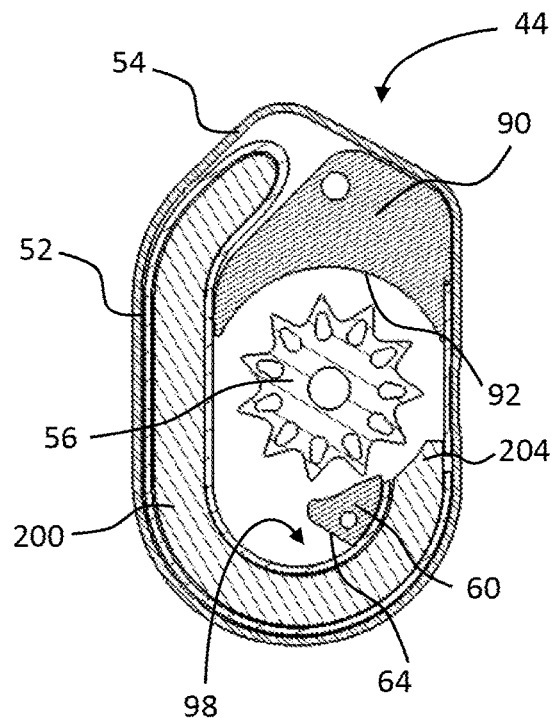
Figure 13:
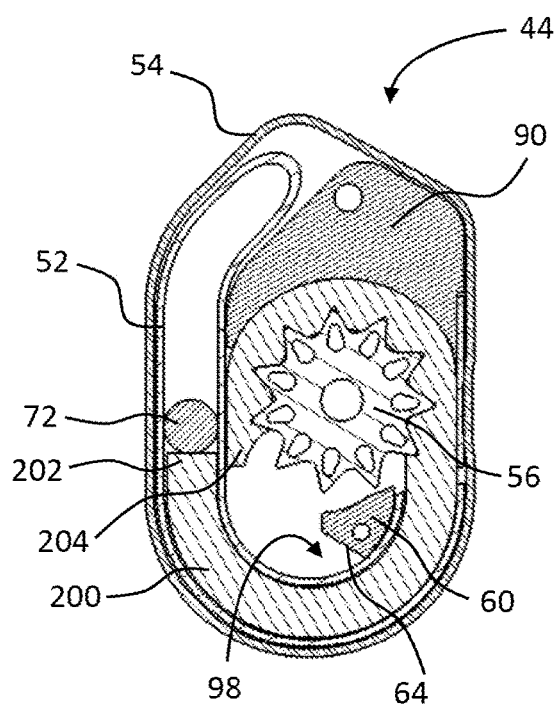
Figure 14:
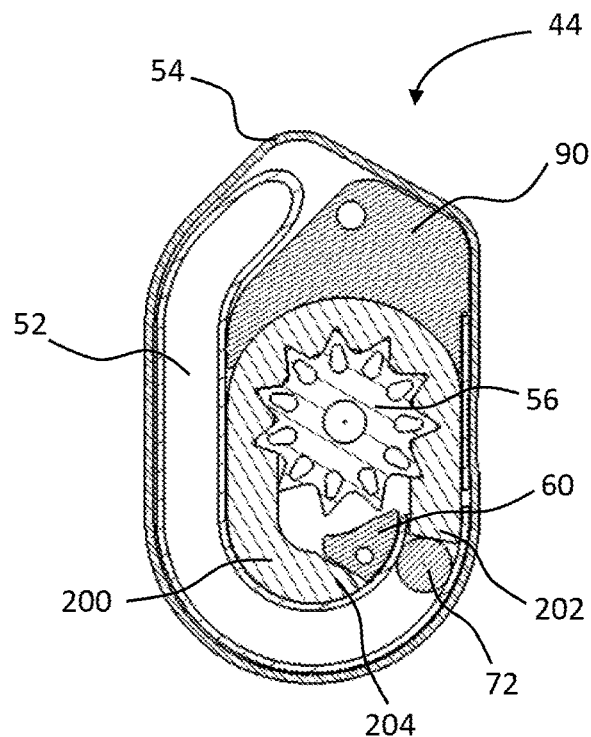

FIG. 9A is a side cut-away view of the pretensioner rod and the pretensioner wheel in a first, non-actuated state of the pretensioner system, FIG. 9B is a side cut-away view of the pretensioner rod and the pretensioner wheel when the pretensioner rod firstly contacts the pretensioner wheel in a actuated state of the pretensioner system, FIG. 9C is a side cut-away view of the pretensioner rod and the pretensioner wheel when the pretensioner rod engages with a couple of vanes of the pretensioner wheel during pretensioning, and FIG. 9D is a cross-sectional view of the engagement between the pretensioner rod and the vane, taken along line 9D-9D in FIG. 9B;

FIG. 10 is a perspective view of a guide plate according to the present disclosure;

FIG. 11 is a cross-sectional view of the seatbelt retractor assembly including the pretensioner system in a third state, taken along line A-A of FIG. 3;

FIG. 12 is a cross-sectional view of the seatbelt retractor assembly including the pretensioner system in a first, non-actuated state, taken along line A-A of FIG. 3;

FIG. 13 is a cross-sectional view of the seatbelt retractor assembly including the pretensioner system with a seal in a second state, taken along line A-A of FIG. 3; and FIG. 14 is a cross-sectional view of the seatbelt retractor assembly including the pretensioner system with the seal in a third state, taken along line A-A of FIG. 3.

It should be understood that throughout the drawings, corresponding reference numerals indicate like or corresponding parts and features.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

Figure 1:
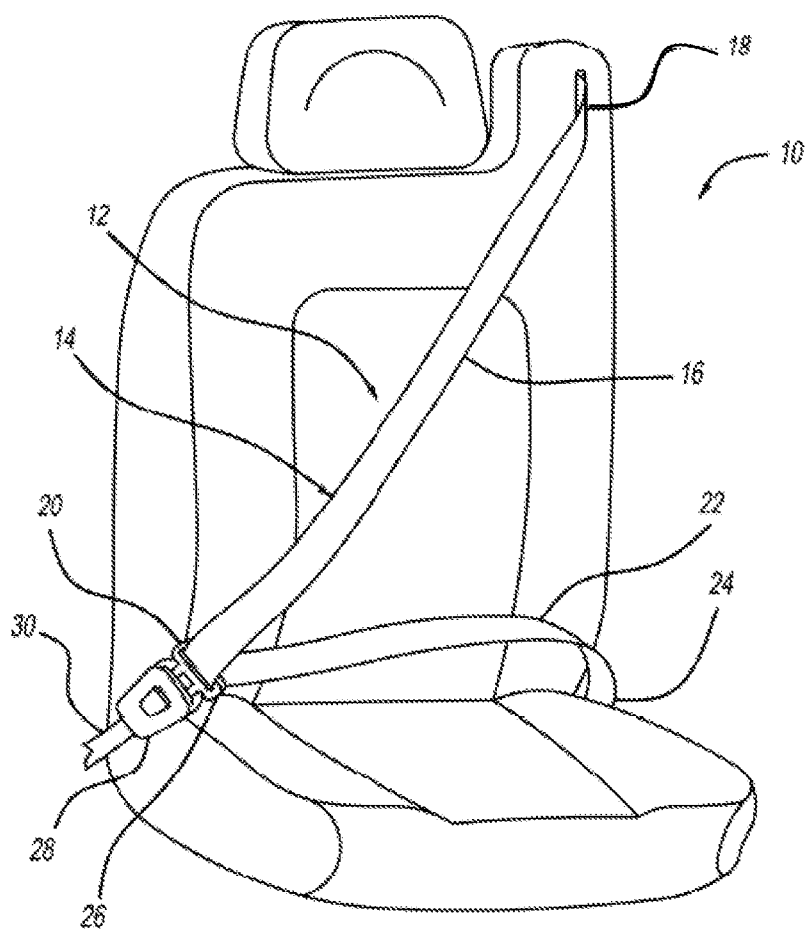
FIG. 1 shows a perspective view of an occupant restraint system.

FIG. 1 illustrates a vehicle seat 10 and a seatbelt assembly 12 for a vehicle according to an exemplary form of the present disclosure. The seatbelt assembly 12 includes a seatbelt webbing 14 having a shoulder belt portion 16 extending from an upper guide loop or anchorage 18 to a latch plate 20 and a lap belt portion 22 extending from the latch plate 20 to a lower anchorage 24. The latch plate 20 can include a loop portion 26 through which the webbing 14 extends. The latch plate 20 can be inserted into a seatbelt buckle 28 to lock and unlock the seatbelt assembly 12. A seatbelt buckle cable or strap 30, either directly or in cooperation with other components, secures the seatbelt buckle 28 to a portion of the vehicle frame. It will be appreciated that other manners of attaching the seatbelt webbing 14 to vehicle could also be used, including variations on the latch plate 20 and the seatbelt buckle 28 and their attachments to the webbing 14 and associated vehicle structure.

The seatbelt webbing 14 is able to pay-out from a retractor assembly 32 (shown in FIGS. 2 and 3), which is located within the vehicle seat 10 (in an integrated structural seat design) or is coupled structurally to the vehicle body, so that the effective length of the seatbelt webbing 14 is adjustable. When the buckle latch plate 20 has been fastened to the seatbelt buckle 28, the seatbelt assembly 12 defines a three-point restraint between the upper anchorage 18, the buckle latch plate 20, and the lower anchorage 24. Any other suitable configurations, such as alternative locations for the retractor assembly 32, the buckle latch plate 20, and the lower anchorage 24, may be used with the present disclosure.

Figure 2:
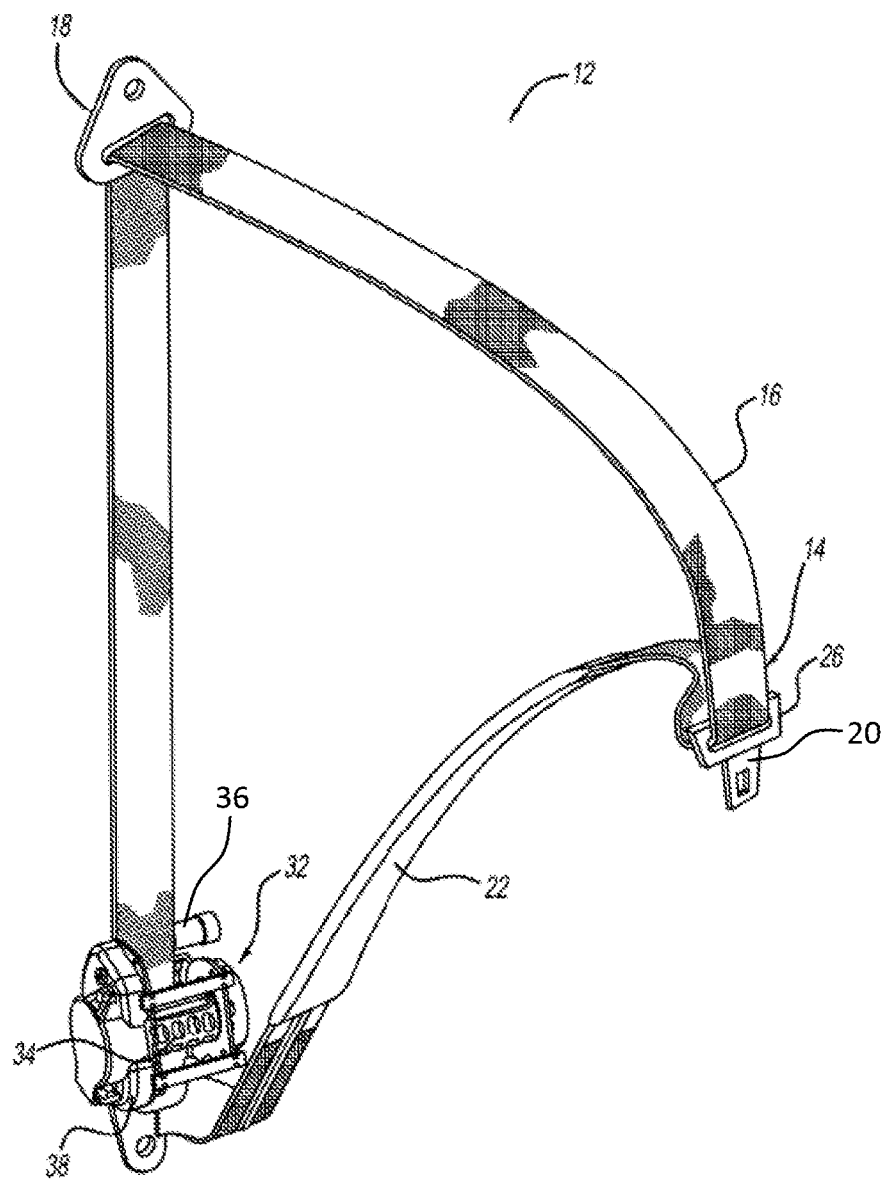
FIG. 2 is a perspective view of the occupant restraint system with various components removed to show a seatbelt retractor assembly including a pretensioner system of FIG. 1.

Referring to FIG. 2, an isometric view of the seatbelt assembly 12 of the described embodiment is illustrated disassociated from the vehicle and showing the retractor assembly 32. The retractor assembly 32 includes a spool assembly 34 and a gas generator 36 mounted to a common frame 38. The spool assembly 34 is connected with and stows the webbing 14 of the shoulder belt portion 16, whereas the end of the lap belt portion 22 of the webbing 14 is fixedly engaged with the anchorage point, for example, the frame 38 or another portion of the vehicle such as the seat 10 or floorpan.

Referring to FIG. 3, the spool assembly 34 includes a spindle 40 that engages the shoulder belt portion 16 of the seatbelt webbing 14 and rotates to wind-up or pay-out the seatbelt webbing 14. A torsional "clock" or "motor" type spring is carried within a spring end cap 42 and rotationally biases the spindle 40 to retract the seatbelt webbing 14. The spool assembly 34 may further incorporate other spool control mechanisms that are known in accordance with the prior art, including pretensioners, inertia and webbing sensitive locking devices, torsion bar load limiters, or other belt control devices. "Spool control systems" referred to in this specification may include any system that controls the rotational movement of a webbing spool, thus controlling the extraction and retraction of seatbelt webbing. One such spool control system is a motor-assisted retractor. Spool locking devices typically incorporate a vehicle sensitive locking mechanism having an inertia sensitive element, such as a rolling ball or pendulum, and cause a pretensioner wheel of the spool control system to be engaged to prevent further withdrawing of the seatbelt webbing 14 from the spindle 40. Webbing sensitive locking devices sense rapid pay-out of seatbelt webbing 14 to lock the retractor assembly 32. Various electronic sensing mechanisms that detect the withdrawal of seatbelt webbing 14 and/or the connection of the latch plate 20 to the seatbelt buckle 28 may also be incorporated into the retractor assembly 32.

During normal operation of the vehicle, the retractor assembly 32 allows pay-out of seatbelt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate, then the retractor assembly 32 is locked. Due in part to the free pay-out of the seatbelt webbing 14, the seatbelt assembly 12 often develops slack during normal use.

Figure 4:
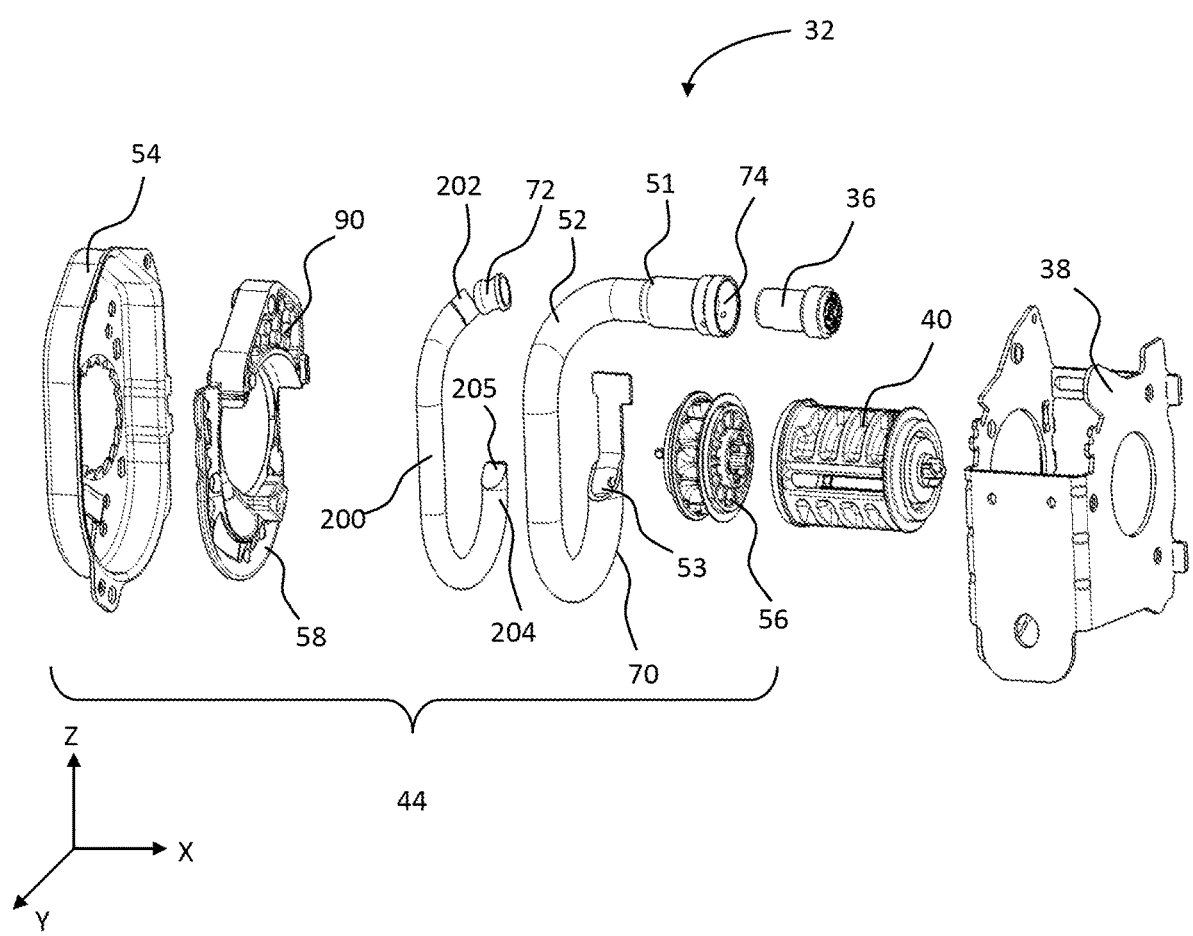
FIG. 4 is an exploded view of the seatbelt retractor assembly including the pretensioner system shown in FIG. 3.

FIG. 4 shows an exploded view of the retractor assembly 32 including a pretensioner system 44 in accordance with an exemplary form of the present invention. Referring to FIGS. 3-4, the retractor assembly 32 further incorporates the pretensioner system 44 operatively connected to the spool assembly 34 and operable to rotate the spindle 40 for pretensioning. As known to those of skill in the art, a retractor pretensioner winds seatbelt webbing into a more tight condition against the occupant at the initial stages of a detected vehicle impact. This is provided to reduce forward motion or excursion of the occupant in response to the deceleration forces of a vehicle impact or rollover.

As shown in FIGS. 3 and 4, the pretensioner system 44 includes a pretensioner tube 52 in communication with the gas generator 36 at a first tube end 51 of the pretensioner tube 52. The gas generator 36 is used to provide expanding gas in response to a firing signal. As known in the art, for example, the vehicle includes a sensor array sending a signal indicative of an emergency event such as an impact event, crash, or rollover. The vehicle sensor may be a specific impact sensor, or may be a traditional vehicle sensor (e.g., longitudinal or lateral acceleration sensor or otherwise part of a control system having a suite of multiple sensors). Any other impact sensor that is or will be known to those skilled in the art may also be readily employed in conjunction with the seatbelt assembly 12 of the present disclosure. An electronic control unit such as a central processing unit (CPU) or other controller receives a signal and controls the seatbelt assembly 12 to respond by tightening the seatbelt webbing 14 of the vehicle (e.g., via activation of a pretensioner).

In FIG. 4, the pretensioner tube 52 has a pretensioner rod 200, e.g., a polymer rod or a plastically deformable polymer rod disposed therein (also shown in FIG. 5) that has an elongate shape and is flexible within the tube 52. More specifically and as will be discussed in further detail below, the polymer rod 200, when disposed outside of the pretensioner tube 52 prior to insertion therein, has a generally straight shape, and when inserted into the tube 52 it will bend and flex in accordance with the tortuous shape of the tube 52 as shown in the exploded view of FIG. 4.

As shown in FIGS. 3 and 4, the retractor assembly 32 includes the spool assembly 34 mounted to the common frame 38. More particularly, the spool assembly 34 will rotate relative to the common frame 38 to wind the seatbelt webbing 14 attached to the spool assembly 34. The common frame 38 includes a housing 54 for placing the components of the pretensioner system 44 inside the housing 54.

In FIG. 4, the spool assembly 34 includes a pretensioner wheel 56 that is disposed within the housing 54. The pretensioner wheel 56 is attached to the spindle 40. Rotation of the pretensioner wheel 56 will cause the attached spindle 40 to rotate to wind the seatbelt webbing 14 that is attached to the spindle 40.

Figure 5:
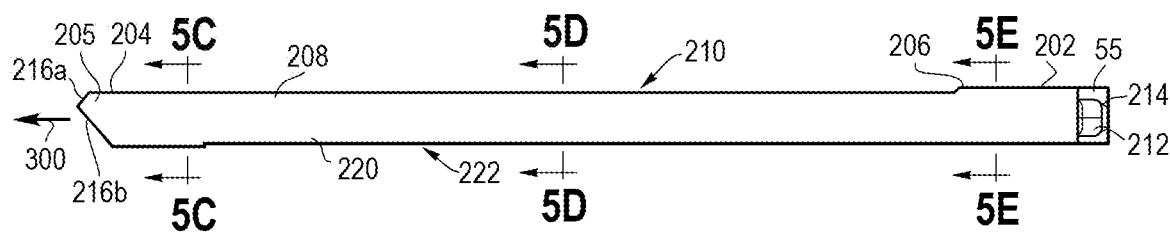
FIG. 5 is a side cut-away view of a pretensioner rod and a stopper according to the present disclosure.

Referring to FIG. 5, the pretensioner rod 200 has a generally circular cross-section in a form of the exemplary embodiment. According to other exemplary embodiments, the rod 200 could have a non-circular cross-section, such as a rectangular cross-section, triangular cross-section, or other polygonal cross-section that allows the rod 200 to be inserted into the tube 52 and adapt to the tortuous shape of the tube 52 when inserted. The polygonal cross-section may rotate along the length of the rod 200 to create a spiral shape. In addition, the rod 200 may include protrusions, such as longitudinal rails or circumferential rings, or recesses, such as longitudinal or circumferential grooves.

In FIG. 5, the pretensioner rod 200, when disposed outside of the pretensioner tube 52, has a generally straight shape and extends in a longitudinal direction 300 from a proximal end portion 202 to a distal end portion 204. The proximal end portion 202 is disposed towards the gas generator 36 when the pretensioner rod 200 is installed within the pretensioner system 44. According to an exemplary embodiment, the pretensioner rod 200 has a cross-section that varies along its length to define a non-recessed portion 206 and a recessed portion 208 that defines a recess (a first recess) 210. As shown in FIG. 5, the recessed portion 208 extends along a majority of the overall length of the pretensioner rod 200 from the proximal end portion 202 to and including the distal end portion 204. In an example, the recessed portion 208 extends to a distal-most end 205 of the distal end portion 204 of the pretensioner rod 200. In addition, the proximal end portion 202 includes the non-recessed portion 206 in which the recess 210 terminates at a distal-most section of the non-recessed portion 206.

The pretensioner rod 200 also includes a protrusion 212, e.g., nub or post, extending proximally from the proximal end portion 202. A stopper 55 has a negative feature 214 formed therein that receives the protrusion 212 to couple the stopper 55 to the proximal end portion 202 of the pretensioner rod 200. According to a form of the present disclosure, the negative feature 214 and the protrusion 212 are sized such that the stopper 55 is compression fit, e.g., interference fit, onto the protrusion 212 to fixedly couple the stopper 55 to the pretensioner rod 200. Other forms of coupling and/or fixing the stopper 55 to the protrusion 212 and/or the proximal end portion 202 may be used, such as, for example, an adhesive, mechanical means, or the like.

Figure 5A:
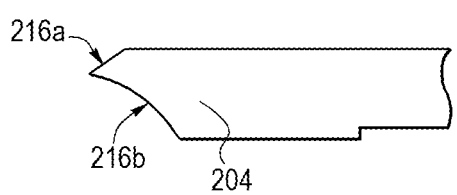
FIG. 5A is a detailed view of a distal end portion of the pretensioner rod shown in FIG. 5.
Figure 5B:
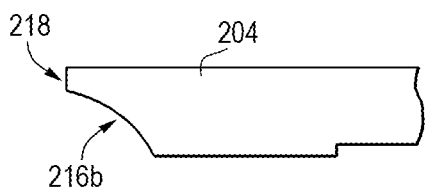
FIG. 5B is a detailed view of a distal end portion of a pretensioner rod in accordance with another exemplary form of the present disclosure.
Figure 5C:
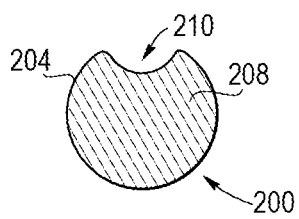
FIG. 5C is a cross-sectional view of the pretensioner rod, taken along line 5C-5C in FIG. 5.
Figure 5D:
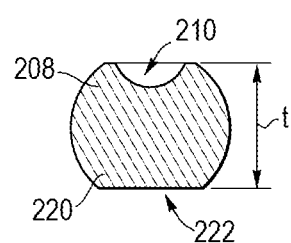
FIG. 5D is a cross-sectional view of the pretensioner rod, taken along line 5D-5D in FIG. 5.
Figure 5E:
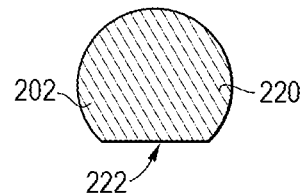
FIG. 5E is a cross-sectional view of the pretensioner rod, taken along line 5E-5E in FIG. 5.

Referring to FIGS. 5, 5A and 5B, in accordance with an exemplary embodiment, the pretensioner rod 200 further includes one or more chamfers 216a and 216b at its distal end portion 204 that taper inwardly along a length of the distal-most end 205 in the direction 300. In an example, the pretensioner rod 200 includes the chamfer 216a that is disposed on a same side of the pretensioner rod as the recess 210 is located. The chamfer 216a advantageously reduces the force required to advance the pretensioner rod 200 in the tube 52 to facilitate installation of the pretensioner rod 200 in the pretensioner system 44. As shown in FIG. 5B, however, the chamfer 216a may be formed as a straight end surface 218 according to other form of the present disclosure. In another example, the pretensioner rod 200 includes the chamfer 216b that is disposed on a side of the pretensioner rod 200 opposite the chamfer 216a. The chamfer 216b advantageously facilitates engagement of the pretensioner rod 200 with the pretensioner wheel 56 during pretensioning.

As shown in FIGS. 5, 5A and 5B, the chamfer 216b is formed as a concave shape with a curvature. However, other shapes of the chamfer 216b according to other exemplary embodiments may be implemented. The concave shape of the chamfer 216b is configured to better engage with the pretensioner wheel 56 during pretensioning because the concave shape of the chamfer 216a on the pretensioner rod 200 is formed along a circumference of the pretensioner wheel 56. Due to the concave shape of the rod 200 along the circumference of the pretensioner wheel 56, the chamfer 216b of the pretensioner rod 200 may keep a constant clearance with the pretensioner wheel 56 before pretensioning (see FIG. 9A).

As shown in FIGS. 5, 5C, 5D and 5E, furthermore, the pretensioner rod 200 includes a recessed section 220 to further facilitate bending and preventing or minimizing twisting of the pretensioner rod 200 through the tube 52 during translation towards pretensioner wheel 56. In particular, on a side opposite the recess 210 of the pretensioner rod 200, the recessed section 220 defines a recess (a second recess) 222 and that extends in the longitudinal direction 300. The recessed section 220 extends along the majority of the overall length of the pretensioner rod 200. In a form of the present disclosure, as shown in FIGS. 5, 5C, 5D and 5E, it has been found that by not extending the recess 222 through the distal end portion 204 has a relatively larger or fuller cross-sectional area for engaging the pretensioner wheel 56 during translation, thereby reducing the amount of the stripping of the pretensioner rod 200 which can occur at first contact with the pretensioner wheel 56, thereby increasing performance of the pretensioner system 44. Moreover, it has been found that by not having the recess/groove 210 extend through the proximal end portion 202, the proximal end portion 202 has a relatively larger or fuller cross-sectional area for the stopper 55 to contact to reduce the amount of initial compression on the pretensioner rod 200 during actuation of the gas generator 36, thereby increasing performance of the pretensioner system 44. According to an embodiment of the present invention, when the pretensioner rod 200 is disposed outside of the pretensioner tube 52, the recessed section 220 has a substantially flat, planar surface defining the recess 222. However, the other shape of the recessed section 220 may be implemented according to other forms of the present disclosure.

With reference to FIGS. 4 and 5, the pretensioner rod 200 is preferably made from a polymer material, which has a reduced weight relative to metallic ball driving elements of the other roto-pretensioners. The particular polymer material can be selected to fit the particular desires of the user. The polymer material is preferably one that has sufficient flexibility such that it can bend and flex through the tube 52 to allow for initial installation as well as in response to actuation by the gas generator 36. The polymer material is preferably one that has sufficient stiffness to allow it to be pushed through the tube 52 in response to actuation, such that the rod 200 will sufficiently transfer a load to the pretensioner wheel 56 of the pretensioner system 44.

Further, the pretensioner rod 200 is preferably made from a polymer material that is deformable. During and after actuation, the rod 200 will be deformed in response to actuation and contact with other components of the pretensioner system 44. Accordingly, due to the vanes 102 of the pretensioner wheel 56, the pretensioner rod 200 is dented (elastically and plastically deformed) without any material separation (cutting) of the rod 200, so that the load exerted by the actuation gas pressure of the system 44 is fully transferred to the pretensioner wheel 56 through the deformation of the pretensioner rod 200. This deformation will be further discussed below with reference to the use of the system 44, where the plastic deformation will cause the system become locked to prevent or limit payback of the rod 200 without being completely dependent on maintained actuation gas pressure in the system. The plastic deformation also allows the rod 200 to deform and engage with the vanes of pretensioner wheel 56.

In one approach, the pretensioner rod 200 is made from a nylon thermoplastic material. The rod 200 could also be made from an aliphatic polyamide thermoplastic material. In another approach, the rod 200 could be made from a similar thermoplastic material, such as an acetal material or polypropylene material.

Figure 6:
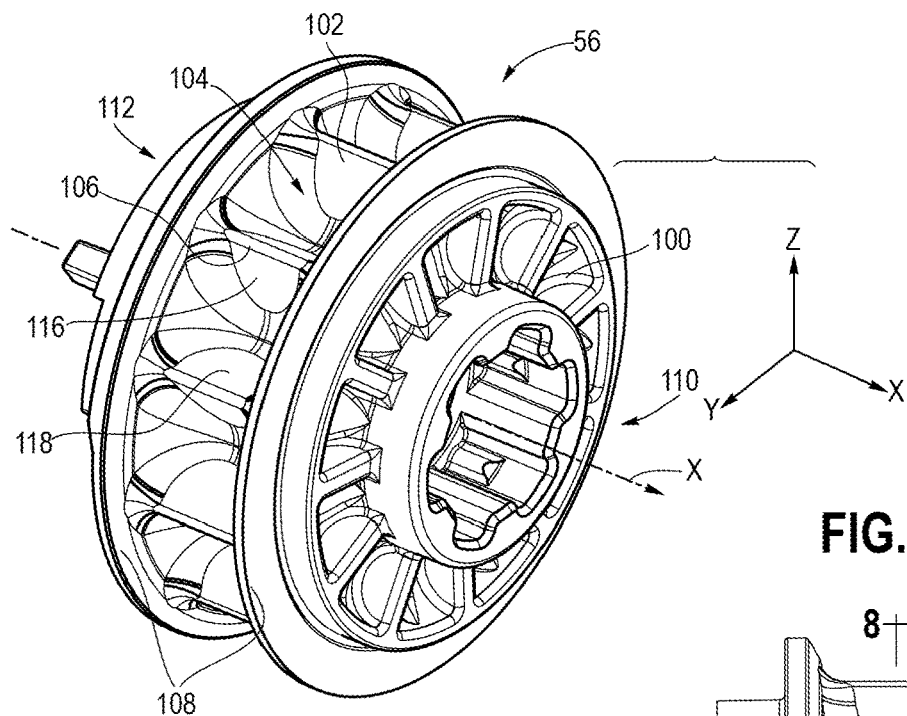
FIG. 6 is a perspective view of a pretensioner wheel with a plurality of vanes with the cavities according to the present disclosure.
Figure 7:
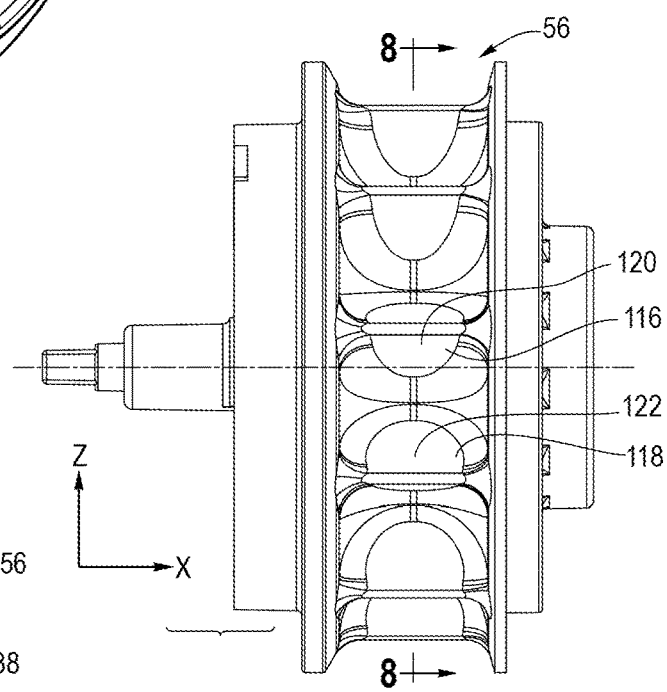
FIG. 7 is a plan view of the pretensioner wheel shown in FIG. 6.

Referring to FIGS. 6 and 7, the pretensioner wheel 56 includes a body portion 100 with a general annular shape. The pretensioner wheel 56 is configured to rotationally couple with the spindle 40 for operatively connecting the pretensioner wheel 56 to the spindle 40 at one side 110, and configured to operatively engage with the spring end cap 42 at the other side 112. As shown in FIGS. 4 and 6, the pretensioner wheel 56 includes a plurality of vanes 102 that each project radially from the body portion 100, such that the vanes 102 extend from the center of the body portion 100. In addition, as shown in FIG. 6, the pretensioner wheel 56 further includes flanges 108 for guiding the pretensioner rod 200 when the rod 200 is engaged with the plurality of vanes 102 of the pretensioner wheel 56. The flanges 108 of the pretensioner wheel 56 radially extends further from the body portion 100 at both sides 110 and 112 compared to a radially outer tip 106 of the vanes 102. Accordingly, the vanes 102 are extended between the pair of flanges 108 along radials extending from a central axis X of rotation of the body portion 100. In addition, the flanges 108 prevent the engaged rod 200 on the vanes 102 of the pretensioner wheel 56 from being laterally disengaged.

Figure 8:
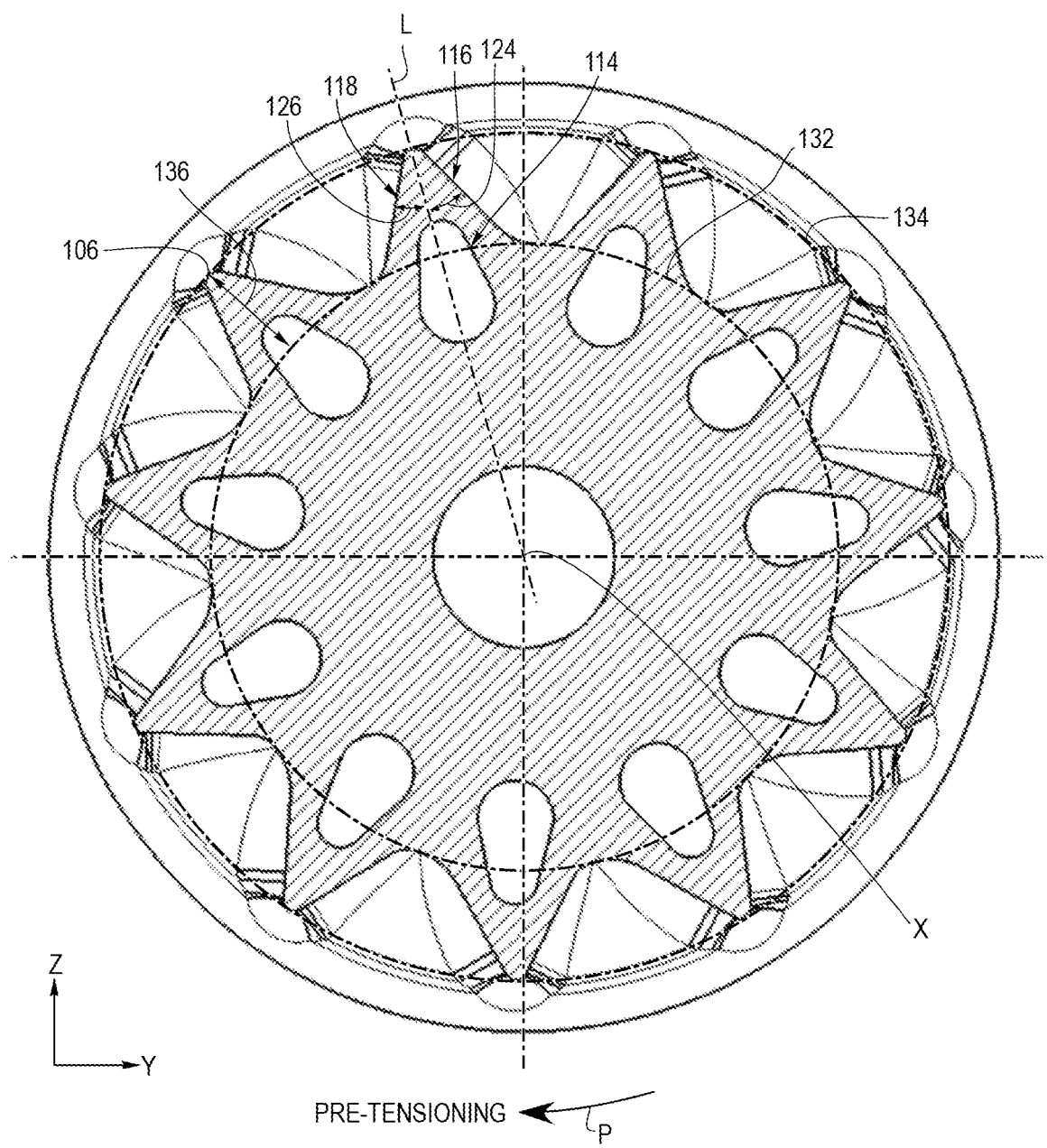
FIG. 8 is a cross-sectional view of the pretensioner wheel, taken along line 8-8 in FIG. 7.

Referring to FIG. 8, each of the vanes 102 can have a uniform size and shape, and be uniformly distributed around the pretensioner wheel 56. The vanes 102 each have a generally triangular shape on a cross-section plane of the pretensioner wheel 56 perpendicular to the central axis X with a root section 114 that tapers into the tip 106 as the vane 102 extends radially outward from the body portion 100. The particular width and pitch of the vanes 102 can be selected as desired. The plurality of vanes 102 combine to form semi-spherical cavities 104 that are disposed between adjacent two of the plurality of vanes 102.

In FIG. 8, the pretensioner wheel 56 is formed with an odd number of vanes 102 between 5 and 13 vanes. For example, the pretensioner wheel 56 is preferably formed with 11 vanes. However, the number of the vanes 102 is adjusted according to the desired load and size of the pretensioner system 44. As shown in FIG. 8, when the pretensioner wheel 56 is formed with 11 vanes, the vanes 102 are evenly spaced around the circumference of the pretensioner wheel 56 with a spacing of approximately 32.73 degrees. Accordingly, the arrangement of the vanes 102 with the odd number is configured to avoid a pinch point as the pretensioner wheel 56 rotates and engages the pretensioner rod 200. That is, the vanes 102 with the odd number prevent the pretensioner wheel 56 from being locked due to the deformed pretensioner rod 200 when the pretensioner rod 200 is engaged with the pretensioner wheel 56 since with an odd number of vanes there are no diametrically opposed vanes which are both compressing the polymer rod.

In addition, a root circle 132 of the pretensioner wheel 56 is defined by connecting each of the root sections 114 of the vane 102, and the diameter (root diameter) of the root circle 132 is, in an exemplary embodiment approximately 28.35 mm. In addition, a tip circle 134 of the pretensioner wheel 56 is defined by connecting each tip 106 of the vanes 102, and the diameter (tip diameter) of the tip circle 134 is, in an exemplary embodiment approximately 38.4 mm. Accordingly, a vane height 136 of the vanes 102 is determined by subtracting a radius of the root circle 132 from a radius of the tip circle 134. Generally, the vane height 136 is equal to or less than a half of a radial thickness t of the pretensioner rod 200 (see FIG. 5D). However, the specific dimensions of the vanes 102 described above are modified according to other forms of the present disclosure.

As shown in FIGS. 6, 7 and 8, the vanes 102 form a first sidewall 116 and a second sidewall 118. In FIG. 8, the triangle shape of the vanes 102 on the cross-section plane is formed by two sidewalls 116 and 118, and the root section 114. As shown in FIG. 8, the first sidewall 116 on the triangle shape of the vanes 102 is longer than the second sidewall 118. The second sidewall 118 of the vanes 102 is inclined toward the direction of the rotation of the pretensioner wheel 56 during pretensioning (that is, the second sidewall 118 is facing to the exit 53 of the pretensioner tube 52). The first sidewall 116 is inclined toward the opposite direction of the rotation of the pretensioner wheel 56 during pretensioning. When the rod 200 initially exits toward the pretensioner wheel 56 from the tube 52, the rod 200 first contacts the second sidewall 118 and then engages with the first sidewall 116. That is, the surface of the chamfer 216*b* on the pretensioner rod 200 firstly contacts the second sidewall 118 of the vanes 102 and pushes the pretensioner wheel 56 for driving a rotation. After that, the pretensioner rod 200 continuously engages with the plurality of vanes 102 and is deformed by the vanes 102. (See FIGS. 9A-9C).

As shown in FIG. 7, the first sidewall 116 has a first thumbnail flat surface 120 and the second sidewall 118 has a second thumbnail flat surface 122. The thumbnail flat surfaces 120 and 122 are generally a semi-circular shape on the flat surfaces. However, the shape of the thumbnail flat surface may be changed according to other embodiments of the present invention. The second thumbnail flat surface 122 is laterally wider than the first thumbnail flat surface 120 along the central axis X (between the pair of flanges 108). Accordingly, a second area of the second thumbnail flat surface 122 is generally larger than a first area of the first thumbnail flat surface 120. The larger area of the second thumbnail flat surface 122 is configured to enclose the circumference of the firstly contacted surface of the pretensioner rod 200 (for example, around a half portion of the chamfered surface 216*b* of the pretensioner rod 200, see FIG. 9D) when the rod 200 firstly contacts to the second sidewall 118 so that the pretensioner rod 200 is engaged with the pretensioner wheel 56 without slipping.

As shown in FIG. 8, furthermore, the vanes 102 have a generally triangle shape in cross-section, and the triangle shape of the vanes 102 on the cross-section plane is not symmetric with respective to a radial line L between the radially outer tip 106 and the central axis X of the pretensioner wheel 56 because the vanes 102 have two different sidewalls 116 and 118 inclined with two different angles. Accordingly, a first angle 124 between the radial line L and the first sidewall 116 is defined and for example, the first angle 124 in one exemplary embodiment is between 28 degrees and 38 degrees. A second angle 126 between the radial line L and the second sidewall 118 is defined and for example, the second angle 126 is between 17 degrees and 27 degrees. Preferably, as shown in FIG. 8, in an exemplary embodiment, the first angle is 30 degrees and the second angle is 25 degrees. Accordingly, the first angle 124 is greater than the second angle 126 because the second sidewall 118 is steeper than the first sidewall 116 for better engaging with the chamfered surface 216b in the distal end portion 204 of the pretensioner rod 200 when the pretensioner rod 200 firstly contacts the second sidewall 118.

Figure 7A:
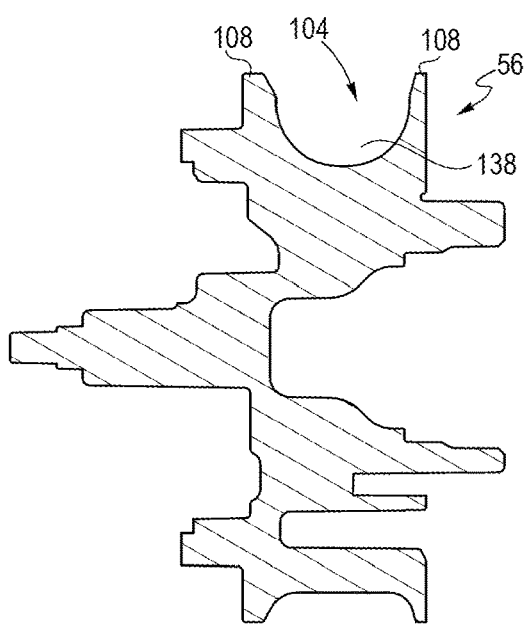
FIG. 7A is a cross-sectional view of the pretensioner wheel on a X-Z plane of FIG. 7.

FIG. 7A shows a cross-section view of the pretensioner wheel 56 in a X-Z plane. As shown in FIG. 7A, on a cross-section plane of the pretensioner wheel 56 parallel to the central axis X, the cavity 104 formed between adjacent two of the plurality of vanes 102 has a pocket 138 and the pocket 138 of the cavity 104 preferably is formed as a U-shape. However, the pocket 138 of the cavity 104 may be changed according to other form of the present invention. In addition, a bottom section of the U-shape of the pocket 138 is formed as a semi-circle shape or a radiused shape. Generally, the radius range of the radiused U-shape is between 3 mm and 7 mm, and preferably the radius of the U-shape is 5 mm.

FIGS. 9A to 9C illustrates how the pretensioner rod 200 engages with the pretensioner wheel 56 when the pretensioner rod 200 is just exited from the tube 52 for pretensioning. In FIG. 9A, as described above, the pretensioner rod 200 is disposed within the pretensioner tube 52 and the curved surface of the chamfer 216b is arranged parallel along the circumference of annular body portion 100 of the pretensioner wheel 56 for better engaging with the pretensioner wheel 56 during pretensioning. In this state, the second sidewall 118 of the vanes 102 is facing to the exit 53 of the pretensioner tube 52 for firstly receiving the rod 200. During pretensioning, as shown in FIG. 9B, when the pretensioner rod 200 travels toward the pretensioner wheel 56, the rod 200 moves along a pretensioning direction P and firstly contacts the second sidewall 118 of the vane 102 in the pretensioning direction P so that the pretensioner rod 200 makes the pretensioner wheel 56 rotating with respective to the central axis X. As shown in FIG. 9C, due to the rotation of the pretensioner wheel 56, the pretensioner rod 200 is continuously engaged with the vanes 102 of the pretensioner wheel 56. Accordingly, when pretensioner rod 200 fully comes out from the tube 52 and engages with the pretensioner wheel 56, the pretensioner rod 200 is engaged around the pretensioner wheel 56 more than 180 degrees as shown in FIG. 11 so that the system 44 is pretensioned.

As shown in FIG. 9C, when the pretensioner rod 200 is engaged with the pretensioner wheel 56, the pretensioner rod 200 is deformed according to the engaged vanes 102 and cavities 104. The pretensioner rod 200 is deformed or dented along the asymmetric triangle shape of the vanes 102, and the rod 200 is deformed to fill into the cavities 104 such that the filled portion of the rod 200 is generally a half ball or elliptical shape in the cavities 104. Due to the vanes 102 of the pretensioner wheel 56, as shown in FIG. 9, the deformed shape of the rod 200 is similar to the shape of the vane 102. Accordingly, due to the vane 102, a deformed depth D in the deformed section of the rod 200 is between 50% and 90% of the vane height 136 of the vanes 102. In addition, the deformed depth D is not greater than a half of the radial thickness t of the pretensioner rod 200. Preferably, the deformed depth D is between 10% and 50% of the radial thickens t of the pretensioner rod 200. When the pretensioner rod 200 is engaged with the pretensioner wheel 56 during pretensioning, the pretensioner rod 200 keeps the engagement with the pretensioner wheel 56 without any separation (cutting) of the material of the pretensioner rod 200. Therefore, the load exerted by the gas pressure is fully transferred to the pretensioner wheel 56 because the pretensioner rod 200 is fully engaged without any separation (cutting) of the rod material even though the pretensioner rod 200 is deformed or dented. In addition, the tip 106 of the vane 102 is formed with a rounded shape defining an external radius for preventing the pretensioner rod 200 from being cut so that the pretensioner rod 200 is deformed instead of being cut. The radius range of the tip is between 0.35 mm and 0.55 mm, and preferably the radius of the tip is 0.47 mm.

Referring back to FIGS. 7 and 8, the vanes 102 is thickened for structurally reinforcing the area of the tip 106 during pretensioning. As described above, the first angle is approximately 30 degrees and the second angle is approximately 25 degrees. Accordingly, the angle on the tip 106 of the vanes 102 is approximately 55 degrees by combining the first and second angles 124 and 125 so that the vanes 102 are not broken and support the force exerted by the pretensioner rod 200. As shown in FIG. 8, due to the improved structure of the vanes 102 having the first and second sidewalls 116 and 118 with the first and second angles 124 and 126, the torque transmission of the pretensioning system 44 is effectively improved by engagement between the pretensioner rod 200 and the structurally improved vanes 102 of the pretensioner wheel 56.

Referring to FIGS. 4, 10 and 11, the pretensioner system 44 further includes a guide plate 58, which is placed inside the housing 54. The guide plate 58 includes a guide portion 90 disposed within the housing 54 similar to the pretensioner wheel 56. The guide portion 90 having a generally arcuate landing surface 92 is disposed opposite an exit 53 of the tube 52, and the pretensioner wheel 56 is disposed between the guide portion 90 and the tube 52. As shown in FIG. 11, accordingly, the pretensioner rod 200 exiting the tube 52 will contact the pretensioner wheel 56 prior to contacting the guide portion 90 of the guide plate 58.

In FIGS. 10 and 11, the guide plate 58 further defines an overflow cavity 98 that is disposed opposite the guide portion 90. The overflow cavity 98 is also disposed adjacent the curvature of the tube 52, and the pretensioner wheel 56 is disposed between the guide portion 90 and the overflow cavity 98. The overflow cavity 98 is sized and configured to allow a portion of the rod 200 to be received therein during actuation of the pretensioner system 44 if necessary. For example, after rod 200 has exited the tube 52, it will contact the guide portion 90 and be directed in an arcuate path corresponding to the guide portion 90, such that the rod 200 is ultimately directed toward the overflow cavity 98. The rod 200 can extend into the overflow cavity 98, and can further be guided along the curvature of the tube 52 that is adjacent the overflow cavity 98. However, it will be appreciated that the rod 200 may not necessarily travel far enough during actuation to ultimately reach the overflow cavity 98.

As shown in FIGS. 10 and 11, the guide plate 58 further includes a rod guide 60 disposed at the exit 53 of the tube 52. The rod guide 60 includes a guiding surface 62, a stopping surface 64, a funnel-shaped portion 66 and a stepped portion 68. In FIG. 10, the guiding surface 62 faced to the tube 52 is curved along with an outer surface 70 of the installed tube 52 near the exit 53 of the tube 52, and configured for guiding the rod 200 when the rod 200 is pushed out of the tube 52. The stopping surface 64 is faced to the overflow cavity area 98 and configured for stopping the rod 200 when the rod 200 is reached to the overflow cavity 98 after pretensioning. As shown in FIG. 10, the funnel-shaped portion 66 between the guiding surface 62 and the stopping surface 64 is formed. The funnel-shaped portion 66 of the rod guide 60 may stop the rod 200 effectively and be configured for preventing the rod 200 from squeezing between the tube 52 and the pretensioner wheel 56 when the distal end portion 204 of the rod 200 is reached to the overflow cavity 98 after the pretensioning. Accordingly, the rod guide 60 is generally configured to prevent the rod 200 from going into the overflow cavity 98 before engaging with the vanes 102 of the pretensioner wheel 56, and force the rod 200 to engage with the vanes 102.

Referring back to FIG. 4, as described above, the retractor assembly 32 includes the gas generator 36 that provides expanding gas in response to a firing signal. The expanding gas causes an increase in pressure within the tube 52, which ultimately causes the rod 200 to be forced away from the gas generator 36 and through the tube 52.

In FIG. 4, the pretensioner tube 52 includes a piston or a seal 72. The seal 72 can have a cylindrical shape with a cylindrical outer surface as best shown in FIG. 4. However, other suitable shapes of the piston or seal 72 in accordance with other form of the present disclosure may be implemented. Activation of the gas generator 36 enables the seal 72 to resist gas leakage. Pressurized gas within a gas chamber 74 causes the seal 72 to expand, which helps prevent gas from escaping past the seal 72. Accordingly, the seal 72 of the present disclosure is operable to retain a high seal pressure as well as maintain residual gas pressure within the tube 52.

Referring to FIGS. 13 and 14, for example, the seal 72 is formed as a spherical shape. The seal 72 is slidably disposed within tube 52 and is operable to drive the pretensioner rod 200 along an actuating path along the tube 52. As will be understood by those of skill in the art, the seal 72 may be press-fitted or otherwise fitted inside the tube 52. In addition, the seal 72 defines a generally elastic structure, and may be composed of various materials known in the art, such as any suitable plastic or polymer (e.g., polyester, rubber, thermoplastic, or other elastic or deformable material). Moreover, the seal 72 may be die cast, forged, or molded from metal, plastic or other suitable material. According to further aspect of the present disclosure, the seal 72 may be formed using a two-cavity or two shot (2K) injection molding process. The generally elastic structure allows the shape of the seal 72 to change slightly in response to pressure, thereby improving the sealing that it provides.

As shown in FIGS. 12 through 14, the general functionality of the pretensioner system 44 will now be described.

The pretensioner has a first, initial or nominal state, in which the pretensioner rod 200 is positioned within the tube 52, as shown in FIG. 12. The seal 72 is positioned upstream of the rod 200. The gas generator 36 is attached to the first tube end 51 of the tube 52 so that the gas chamber 74 is defined between the gas generator 36 and the seal 72 (see FIG. 4).

In response to an event or signal that actuates pretensioning, the gas generator 36 will expel gas into the gas chamber 74. The increased pressure within the chamber 74 will force the seal 72 and rod 200 away from the gas generator 36 and along the path defined by the tube 52. The distal end portion 204 of the rod 200 will translate toward the pretensioner wheel 56, ultimately contacting one of the vanes 102 of the pretensioner wheel 56. The force from the rod 200 exerted against the vane 102 will cause the pretensioner wheel 56 to rotate about its central axis X, thereby ultimately winding the webbing 14 around the spindle 40. At this point, the rod 200 is in a second, actuated position relative to its initial, nominal position as shown in FIG. 13.

The pretensioner rod 200 will continue being driven, such that it contacts the guide portion 90 and is directed to an arcuate path corresponding to the surface 92 of the guide portion 90. The rod 200 will continue to rotate the pretensioner wheel 56 as it translates along the guide portion 90. The distal end portion 204 of the rod 200 will ultimately travel into the overflow cavity 98, disengage from the pretensioner wheel 56 and contact to the rod guide 60 as shown in FIG. 14. The pretensioner wheel 56 will continue to be driven by the engagement between the rod 200 and the pretensioner wheel 56. With the rod 200 partially disengaged with the pretensioner wheel 56, the rod 200 is in third position.

During actuation, the seal 72 will also travel along the tube 52, and the seal's travel assists in driving the rod 200 through the tube 52. The seal 72 likewise has first, second and third positions as shown in FIGS. 12 through 14. As shown in FIGS. 13 and 14, in the second and third position of the rod 200, the seal 72 will have a circumferentially expanded state in the positions.

While the above description constitutes the preferred embodiments of the present invention, it will be appreciated that the invention is susceptible to modification, variation and change without departing from the proper scope and fair meaning of the accompanying claims.

What is claimed is:

1. A pretensioner wheel for a motor vehicle seat belt pretensioner having a pretensioner rod, a housing, a guide plate and a pretensioner tube, the pretensioner wheel comprising:
    a body portion having an annular shape;
    a pair of flanges radially extending from the body portion of the pretensioner wheel;
    a plurality of vanes extending between the pair of flanges along radials extending from a central axis of rotation of the body portion, the plurality of vanes each having a first sidewall and a second sidewall formed as a triangular shape on a cross-section plane of the pretensioner wheel perpendicular to the central axis, the first and second sidewall forming a radially outer tip; and
    a cavity formed between adjacent two of the plurality of vanes,
    wherein the tip of each of the plurality of vanes lies on the radials extending from the central axis of rotation of the pretensioner wheel, and has a first angle formed between the radial and the first sidewall and a second angle formed between the radial and the second sidewall, and the first angle is greater than the second angle, and
    wherein the second sidewall of the vanes is angled to contract contact with a chamfered surface of a distal end portion of the pretensioner rod when the pretensioner rod is exited from the pretensioner tube.

2. The pretensioner wheel of claim 1, wherein the first angle is greater than 28 degrees and less than 38 degrees, and the second angle is greater than 17 degrees and less than 27 degrees.

3. The pretensioner wheel of claim 1, wherein the first angle is 30 degrees and the second angle is 25 degrees.

4. The pretensioner wheel of claim 1, wherein a tip angle of the radially outer tip is formed between the first sidewall and the second sidewall and the tip angle is between 35 degrees and 65 degrees.

5. The pretensioner wheel of claim 1, wherein the tip of each vane is formed as a radiused shape defining an external radius for deforming the pretensioner rod when the pretensioner rod is engaged with the pretensioner wheel.

6. The pretensioner wheel of claim 5, wherein the radius of the tip is between 0.35 mm and 0.55 mm.

7. The pretensioner wheel of claim 5, wherein a deformed depth of the pretensioner rod is between 10% and 50% of a radial thickness of the pretensioner rod engaged with the vanes of the pretensioner wheel.

8. The pretensioner wheel of claim 1, wherein a vane height is defined by subtracting a root radius of a root circle defined by connecting each of root sections of the vanes from a tip radius of a tip circle defined by connecting each of the radially outer tip, and the vane height is equal to or less than a half of a radial thickness of the pretensioner rod engaged with the vanes of the pretensioner wheel so that the vanes of the pretensioner wheel prevent the pretensioner rod from being cut when the pretensioner rod is engaged with the pretensioner wheel during a pretensioning.

9. The pretensioner wheel of claim 1, wherein the vanes of the pretensioner wheel are formed with an odd number between 5 and 13 vanes.

10. The pretensioner wheel of claim 1, wherein the pretensioner wheel is formed with 11 vanes.

11. The pretensioner wheel of claim 1, wherein each of the cavities forms a pocket to receive the pretensioner rod, and the pocket of the cavity is formed as a U-shape on a cross-section plane of the pretensioner wheel parallel to the central axis.

12. The pretensioner wheel of claim 11, wherein a bottom of the pocket is formed with a semi-circle shape or a radiused shape.

13. A pretensioner wheel for a motor vehicle seat belt pretensioner having a pretensioner rod, a housing, a guide plate and a pretensioner tube, the pretensioner wheel comprising:
- a body portion having an annular shape;
- a pair of flanges radially extending from the body portion of the pretensioner wheel;
- a plurality of vanes extending between the pair of flanges along radials extending from a central axis of rotation of the body portion, the plurality of vanes each having a first sidewall and a second sidewall formed as a triangular shape on a cross-section plane of the pretensioner wheel perpendicular to the central axis, the first and second forming a radially outer tip; and
- a cavity formed between adjacent two of the plurality of vanes,
- wherein the tip of each of the plurality of vanes lies on the radials extending from the central axis of rotation of the pretensioner wheel, and has a first angle formed between the radial and the first sidewall and a second angle formed between the radial and the second sidewall, and the first angle is greater than the second angle, and
- wherein each of the first and second sidewall forms a first and second thumbnail flat surface, respectively.

14. The pretensioner wheel of claim 13, wherein an area of the second thumbnail flat surface is larger than an area of the first thumbnail flat surface.

15. The pretensioner wheel of claim 13, wherein the second sidewall of the vanes is angled to contact with a chamfered surface of a distal end portion of the pretensioner rod when the pretensioner rod is exited from the pretensioner tube.

16. A seatbelt pretensioning retractor assembly for a motor vehicle comprising,
- a spindle,
- a frame,
- a housing,
- a pretensioner tube having an arcuate and curved shape having a first tube end in fluid communication with a gas generator and an exit in fluid communication in the housing;
- a pretensioner rod disposed within the pretensioner tube and having a proximal end disposed towards the gas generator and a distal end disposed at the exit of the pretensioner tube; and
- a pretensioner wheel rotatably mounted to the housing and fixedly coupled to the spindle;
- the pretensioner wheel including,
  - a body portion having an annular shape;
  - a pair of flanges radially extending from the body portion of the pretensioner wheel;
  - a plurality of vanes extending between the pair of flanges along radials extending from a central axis of rotation of the body portion, the plurality of vanes each having a first sidewall and a second sidewall formed as a triangular shape on a cross-section plane of the pretensioner wheel perpendicular to the central axis, the first and second sidewall forming a radially outer tip; and
  - a cavity formed between adjacent two of the plurality of vanes,
  - wherein the tip of each of the plurality of vanes lies on the radials extending from the central axis of rotation of the pretensioner wheel, and has a first angle formed between the radial and the first sidewall and a second angle formed between the radial and the second sidewall, and the first angle is greater than the second angle, and
  - wherein the second sidewall of the vanes is angled to contact with a chamfered surface of a distal end portion of the pretensioner rod when the pretensioner rod is exited from the pretensioner tube.

17. The seatbelt pretensioning retractor assembly of claim 16, wherein the tip of each vane is formed as a radiused shape defining an external radius for deforming the pretensioner rod, and a deformed depth of the pretensioner rod is between 10% and 50% of a radial thickness of the pretensioner rod.

18. The seatbelt pretensioning retractor assembly of claim 16, wherein each of the first and second sidewall forms a first and second thumbnail flat surface respectively, and an area of the second thumbnail flat surface is larger than an area of the first thumbnail flat surface.

* * * * *